United States Patent [19]

Asano et al.

[11] Patent Number: 4,853,682
[45] Date of Patent: Aug. 1, 1989

[54] DATA STORED DISPLAY DEVICE

[75] Inventors: Kazuhiro Asano; Yosuke Yoshida; Yoichi Fujioka; Kazuhisa Takazawa; Masao Ishizaki; Yasuo Sakami; Junichi Tsubouchi, all of Tokyo, Japan

[73] Assignee: Seiko Instruments & Electronics Ltd., Japan

[21] Appl. No.: 132,718

[22] Filed: Dec. 11, 1987

Related U.S. Application Data

[63] Continuation of Ser. No. 607,419, May 7, 1984, abandoned.

[30] Foreign Application Priority Data

May 6, 1983 [JP] Japan ......................... 79794
May 6, 1983 [JP] Japan ......................... 79795
May 6, 1983 [JP] Japan ......................... 79796

[51] Int. Cl.4 ............................................ G09G 3/00
[52] U.S. Cl. ........................................ 340/706; 368/1; 368/10
[58] Field of Search ...... 340/706, 718, 825.31–825.35; 364/200, 900; 368/1, 10; 235/380, 382

[56] References Cited

U.S. PATENT DOCUMENTS

| 4,211,065 | 7/1980 | Schmitz et al. ............... 368/1 X |
| 4,277,837 | 7/1981 | Stuckers ................... 340/825.35 X |
| 4,384,288 | 5/1983 | Walton ..................... 340/825.34 |
| 4,454,414 | 6/1984 | Benton ..................... 340/825.35 X |
| 4,459,474 | 7/1984 | Walton ..................... 340/825.33 X |
| 4,523,087 | 6/1985 | Benton ..................... 340/825.33 X |
| 4,534,012 | 8/1985 | Yokozawa ................... 368/1 X |

FOREIGN PATENT DOCUMENTS 2129176 5/1984 United Kingdom ........... 340/825.34

Primary Examiner—Gerald L. Brigance
Assistant Examiner—Jeffery A. Brier
Attorney, Agent, or Firm—Bruce L. Adams; Van C. Wilks

[57] ABSTRACT

A data stored display device such as wrist watch comprises a central processing unit, a transmitting and receiving means for transmitting and receiving data and including a coil, RAMs written in and read out data under the control of the central processing unit, a display panel for displaying data stored in the RAMs and a stand-by switch for changing the transmitting and receiving means for non-transmitting and receiving condition to a transmitting and receiving condition so that the data stored display device can be inputted data from an external controller such as a computer having a transmitting and receiving coil and can function as a display panel of the external controller.

8 Claims, 11 Drawing Sheets

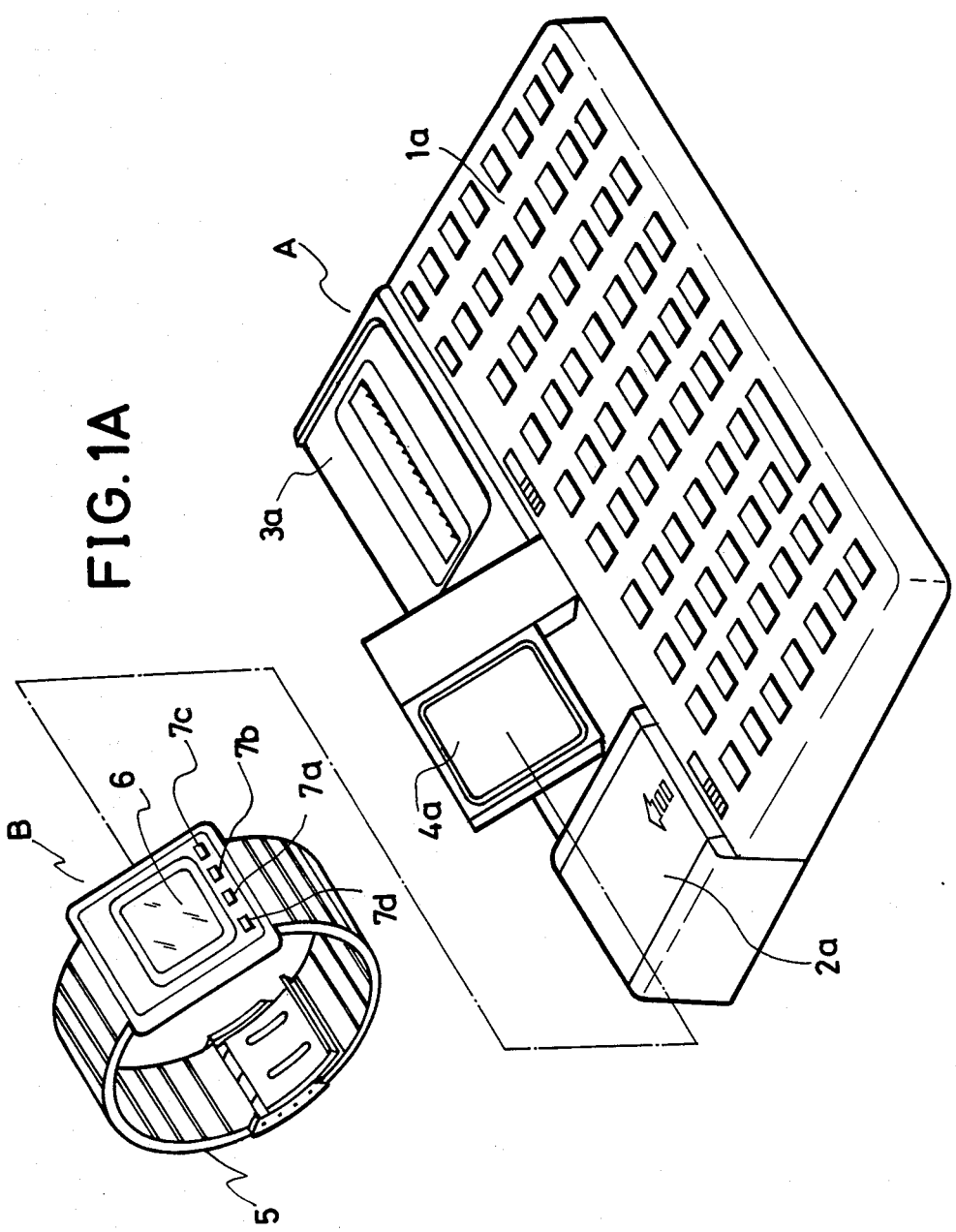

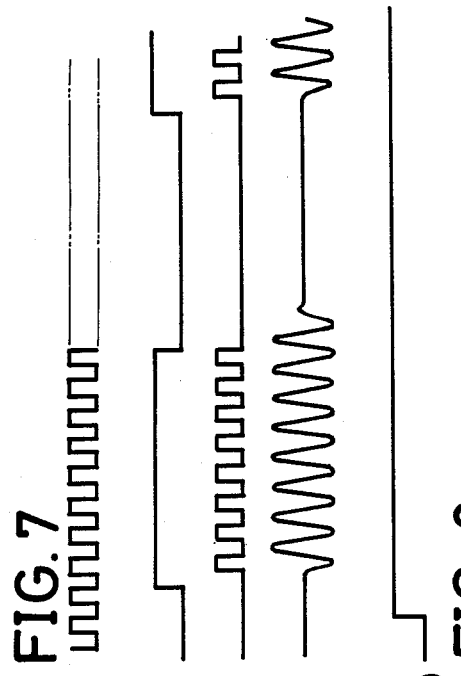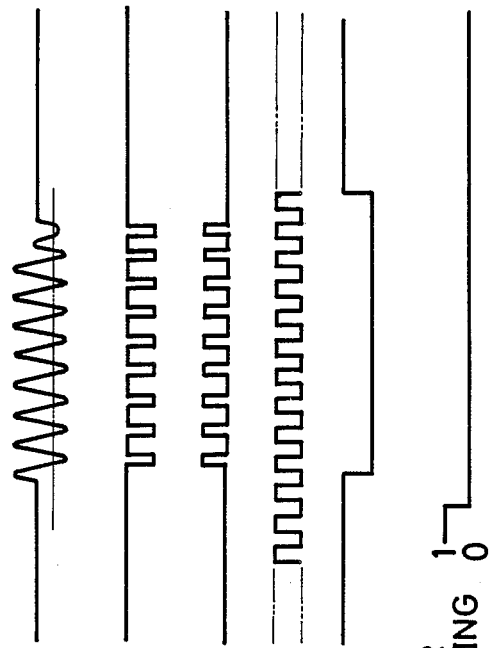
FIG. 7
(A) CLOCK SIGNAL
(B) DATE FOR TRANSMITTING
(C) OUTPUT SIGNAL OF AND CIRCUIT 30
(D) CURRENT OF TRANSMITTING AND RECEIVING COIL 31
(E) CHANGE-OVER SIGNAL FOR TRANSMITTING AND RECEIVING
FIG. 8
(A) INDUCTION VOLTAGE OF TRANSMITTING AND RECEIVING-COIL
(B) OUTPUT OF WAVE SHAPING CIRCUIT 33
(C) RESET SIGNAL
(D) CLOCK SIGNAL
(E) DEMODULATED SIGNAL
(F) CHANGE-OVER SIGNAL FOR TRANSMITTING AND RECEIVING

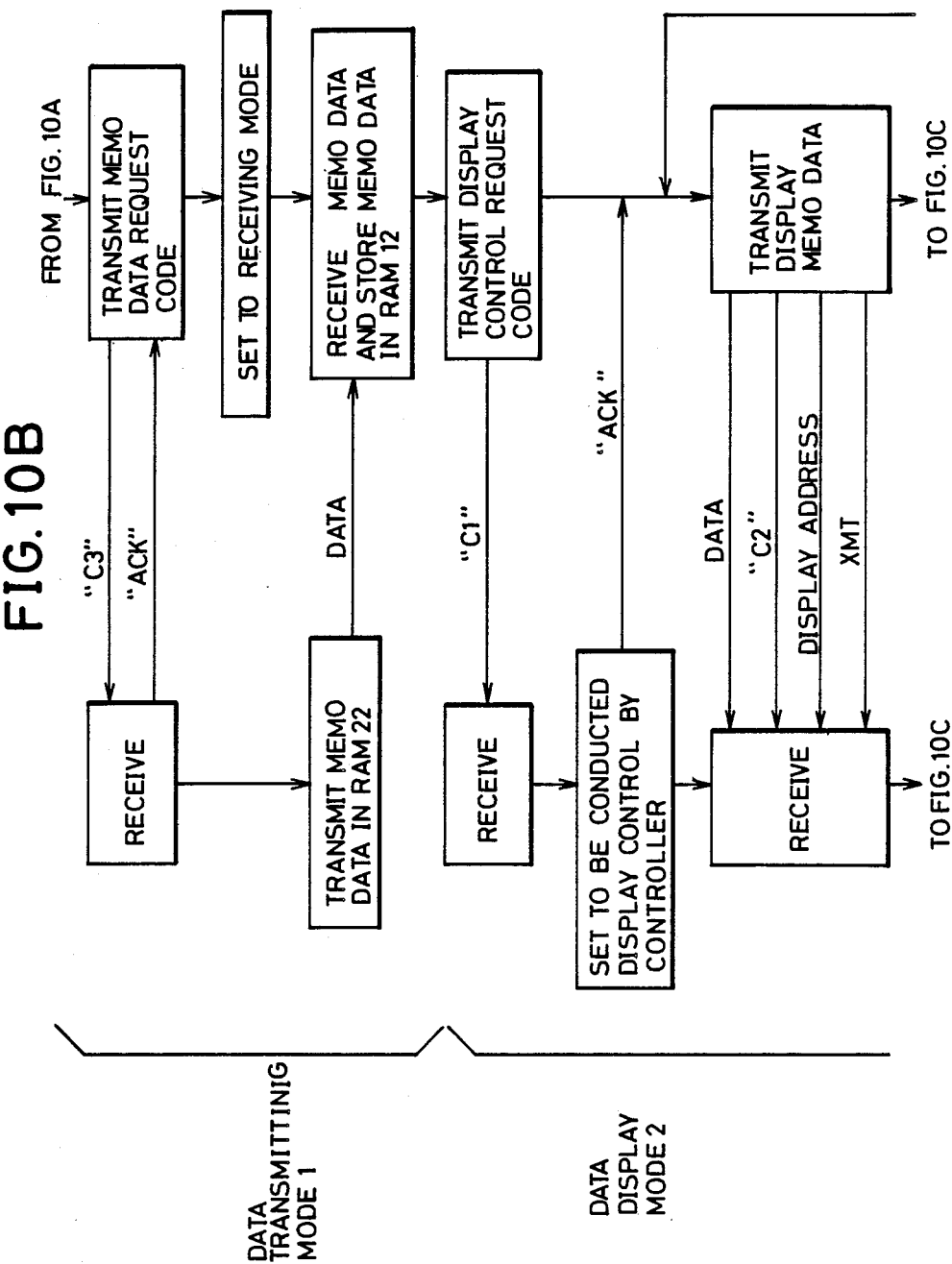

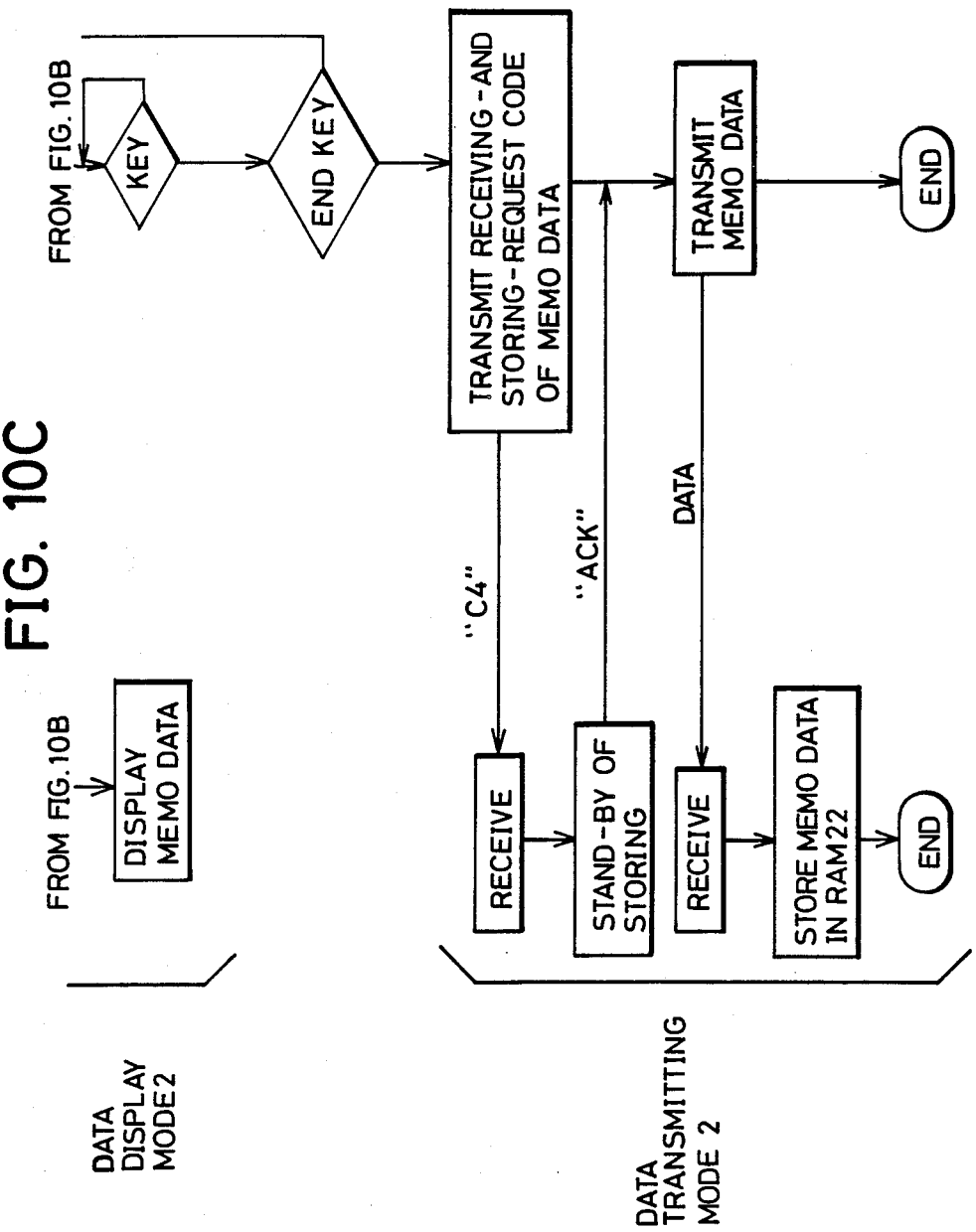

DATA STORED DISPLAY DEVICE

This is a continuation of application Ser. No. 607,419 filed May 7, 1984 now abandoned which claims priority of Japanese Patent Applications Nos. 79794/83; 79795/83; and 79796/83 all filed on May 6, 1983.

BACKGROUND OF THE INVENTION

This invention relates to a data stored display device such as a wristwatch having memory elements and more particularly, relates to a data stored display device capable of editing data to be memorized into the data stored display device by an external controller such as a computer.

Recently, a data stored display device having a plurality of key switches for imputting data as a memo has been put on the market.

However, the conventional data stored display device is disadvantageous because it requires a number of key switches for inputting memo data, and because it needs a separate connector such as a cable between the external controller and the device for inputting memo data from the external controller.

It is difficult for the conventional data stored display device to be made small and waterproof because it has a number of keys or a cable.

The prior art data stored display device is also disadvantageous in that the electrical connection between the device and the external computer becomes unsatisfactory because the connector is apt to rust and because it is difficult to manipulate the connector.

SUMMARY OF THE INVENTION

One object of this invention is to provide a data stored display device eliminates the above mentioned defects.

Another object of this invention is to provide a data stored display device which can be used as the display device of an external controller such as a computer.

Still another object of this invention is to provide a data stored display device comprising a central processing unit controlled by a control program, a transmitting and receiving means including a coil for transmitting and receiving data, memory means in which data can be written in and read out under the control of the central processing unit, and a display means for displaying data stored in the memory means.

BRIEF DESCRIPTION OF THE DRAWINGS

FIG. 1A is a perspective view of a wristwatch serving as a data stored display device according to this invention and an external controller for inputting memo data to the wristwatch, FIGS. 10A, 10B and 10C are flow-charts showing relations between the controller and wristwatch as shown in FIG. 1A.

PREFERRED EMBODIMENTS OF THE INVENTION

Figure 1B:
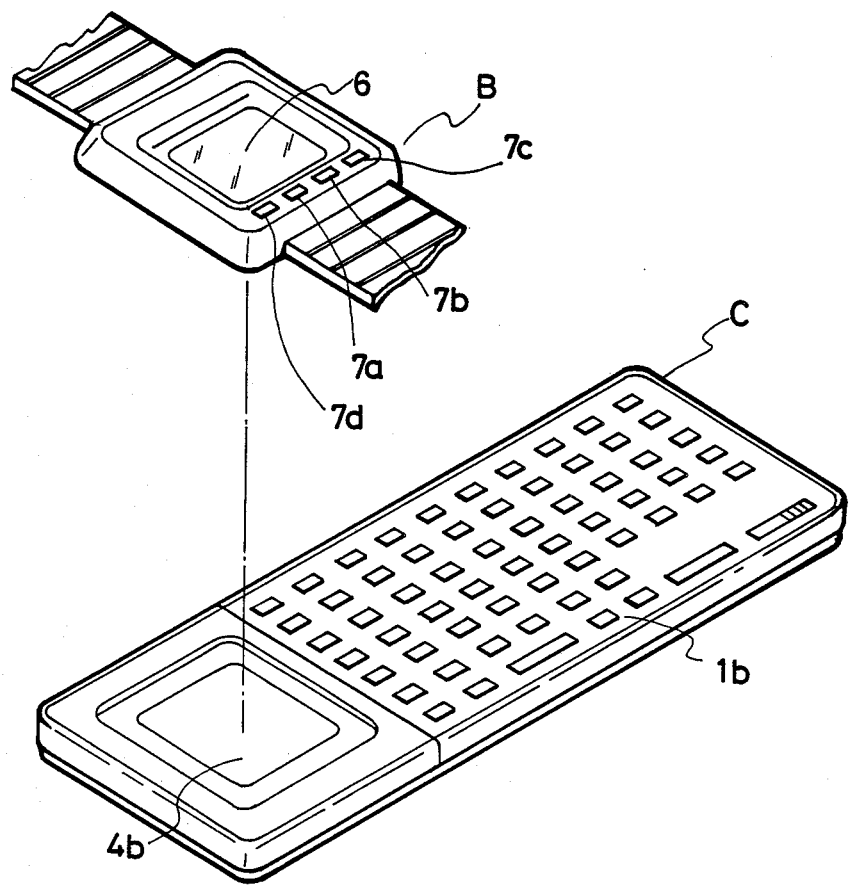
FIG. 1B is a perspective view of the wristwatch and another external controller.

Referring not to the embodiments of this invention, FIG. 1A is an exterior view of a wristwatch serving as a data stored display device and an external controller for inputting memo data to the wristwatch.

The wristwatch B has a wrist band 5, a liquid crystal display panel 6 secured in the center portion of its upper side, button switches 7a, 7b, 7c and 7d arranged on its lower side, and a transmitting and receiving coil.

The external controller A has a keyboard 1a, a receptacle 2a for receiving a ROM pack serving as an external memory on the left of its upper side, a printer 3a arranged on the right side, and an elastic holder 4a for the watch B and having a magnetic transmitter for transmitting and receiving data in the center portion of its upper side.

Although the transmitting and receiving coil is not shown in FIG. 1A, the elastic holder 4a has the coil in the inner part thereof.

FIG. 1B is an exterior view of wristwatch B and another external controller C.

The external controller C has a keyboard 1b on the right side thereof, and a holder 4b which includes the same type coil as the holder 4a in FIG. 1A.

Figure 4:
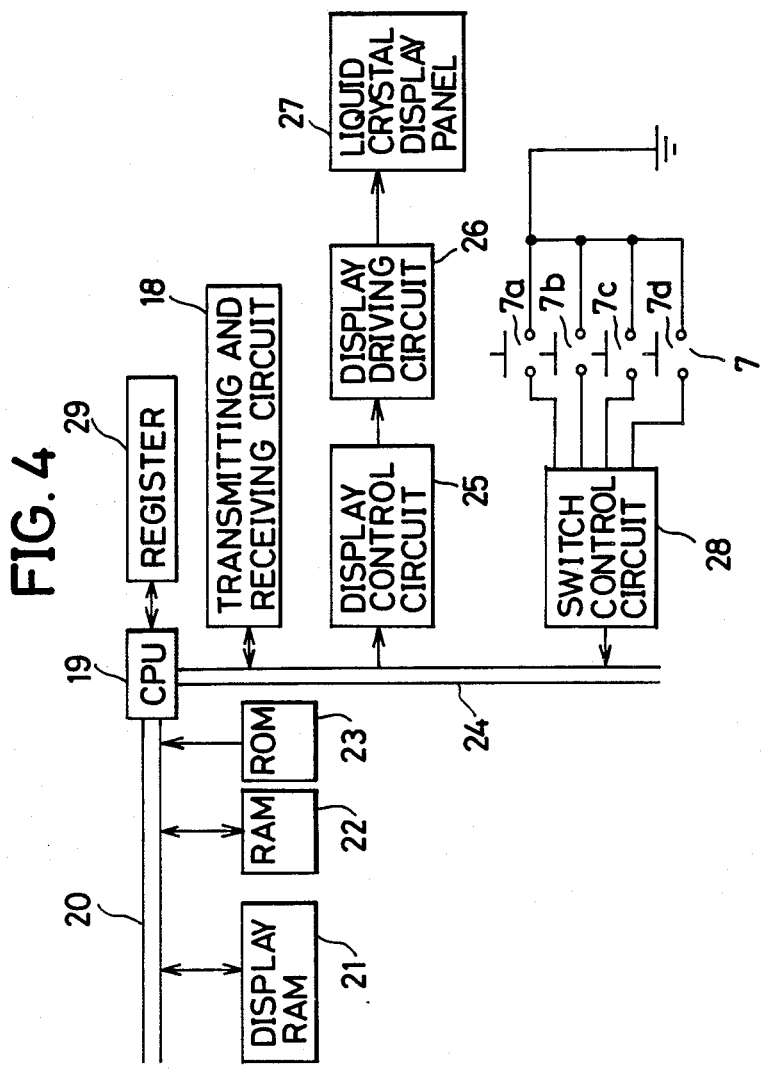
FIG. 4 is a block diagram of circuit used for the wristwatch.

Referring next to FIG. 4, FIG. 4 is a block diagram of a circuit used for the wristwatch B.

Figure 3:
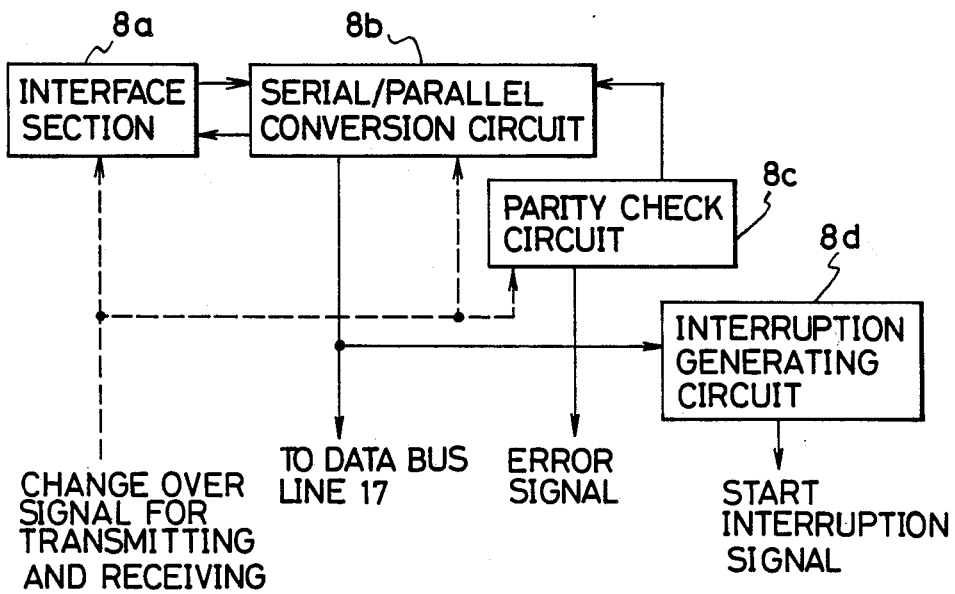
FIG. 3 is a block diagram of circuit showing one embodiment of a transmitting and receiving circuit used in the wristwatch and the external controller.

The reference numeral 18 is the transmitting and receiving circuit for executing the transmitting and receiving of data by means of magnetic transmission between the wristwatch and the external controller. The transmitting and receiving circuit 18 is the same construction as the circuit as shown in FIG. 3 which will be described later.

The reference numeral 19 is a central processing unit (called CPU hereinafter) which is connected through an address data bus line 20 to display RAM21 for storing display data temporarily, RAM22 for storing utility programs and memo data and ROM23 for storing control program. The CPU is connected through an I/O bus line 24 to the transmitting and receiving circuit 18, and is constructed so as to execute programs stored in ROM23 and to control all circuits with a control signal such as codes "$C_1$", "$C_2$", "$C_3$" and "$C_4$" described in FIGS. 10A, 10B and 10C inputted to the transmitting and receiving circuit 18.

The reference numeral 25 is a display control circuit connected to the I/O bus line 24. The display control circuit 25 is constructed so as to output data read out from RAMs 21 and 22 through the CPU and a display driving circuit 26 to a liquid crystal display panel 27.

The reference numeral 28 is a switch control circuit which outputs a control signal through the I/O bus line 24 to CPU19 with the operation of button switches 7a, 7b, 7c and 7d.

Figure 5:
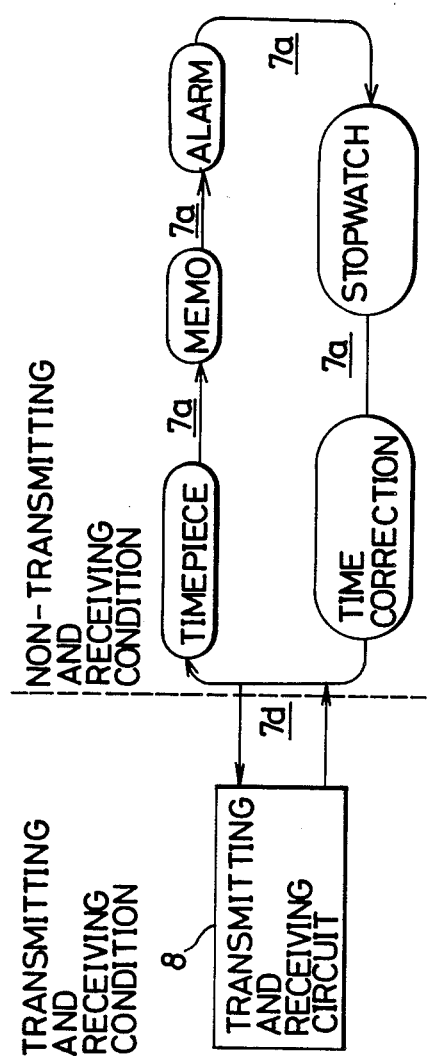
FIG. 5 is an explanatory diagram showing a mode-change of the wristwatch.

In response to the operation of the button switch 7a, the switch control circuit 28 is constructed so as to change the function of the wristwatch cyclically so as to select between the timepiece mode, memo mode, alarm mode, stopwatch mode and time correction mode as shown in FIG. 5.

Referring to the button switches 7a, 7b, 7c and 7d, the button switch 7a serves as a mode switch as described above, the button switch 7b serves as a stand-by switch for changing from a non-transmitting and receiving condition to a transmitting and receiving condition as shown in FIG. 5, the button switch 7c has several functions and serves as a selection switch for selecting the time unit to correct in the time correction mode, as a shift switch for shifting displayed date in an upper direction in the memo mode and as a start-stop switch in the stop watch mode, and the button switch 7d serves as a set switch for setting time in the time correction mode and as a shift switch for shifting displayed date in an lower direction in the memo mode.

The reference numeral 29 is a register connected to the CPU19.

Figure 2:
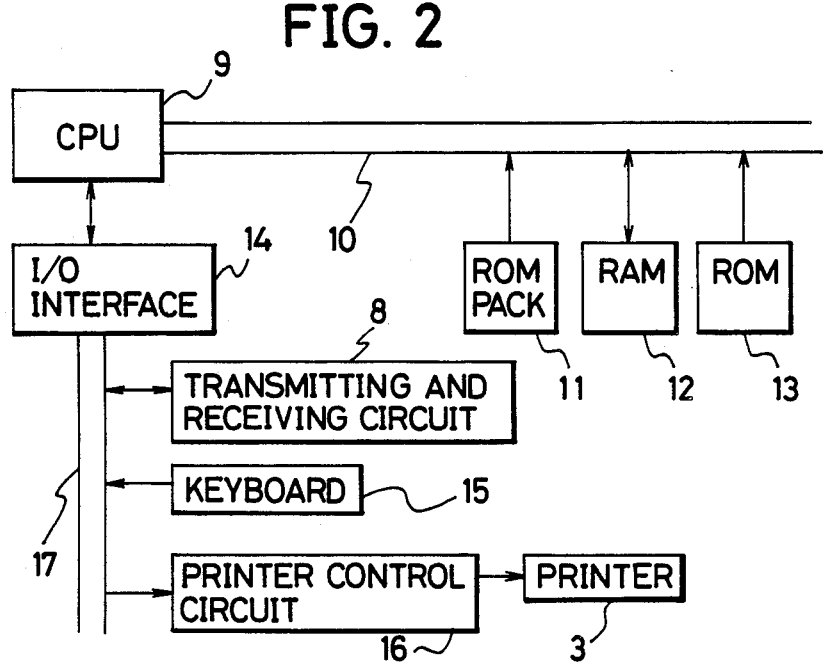
FIG. 2 is a block diagram of circuit used for the external controller.

FIG. 2 is a block diagram of a circuit used for the external controller A.

The reference numeral 8 is a transmitting and receiving circuit for executing the transmitting and receiving of data by means of magnetic transmission between the wristwatch B and the controller A.

As shown in FIG. 3, the transmitting and receiving circuit 8 consists of an interface section 8a for transmitting and receiving data by the medium of magnetic force lines, a serial/parallel conversion circuit 8b for converting a serial signal received at the interface section 8a to a parallel signal and outputting the parallel signal to data bus line, a parity check circuit 8c for outputting an error signal to a central processing unit 9 after detecting the parity of the parallel signal outputted from the serial/parallel conversion circuit 8b and for adding a parity bit to the parallel signal inputted from the data bus line, and an interruption generating circuit 8d for interrupting the CPU upon detecting an interruption signal from the signals outputted on the data bus line from the conversion circuit 8b. Each circuit is constructed to be able to change over from the transmitting mode to the receiving mode and vice versa under the control signal for the transmitting and receiving produced from the CPU9.

Referring again to FIG. 2, the foregoing CPU9 is connected to a ROM pack 11 for storing utility-programs through an address data bus line 10, RAM12 and ROM13 for storing the control program. Further, the CPU9 is connected to the transmitting and receiving circuit 8, the keyboard 15, and a printer control circuit 16 through an I/O interface 14. The CPU9 is constructed to be able to execute programs stored in each of RAM12 and ROM13 and to output data on an I/O bus line 17 to the wristwatch by the transmitting and receiving circuit 8.

Figure 6:
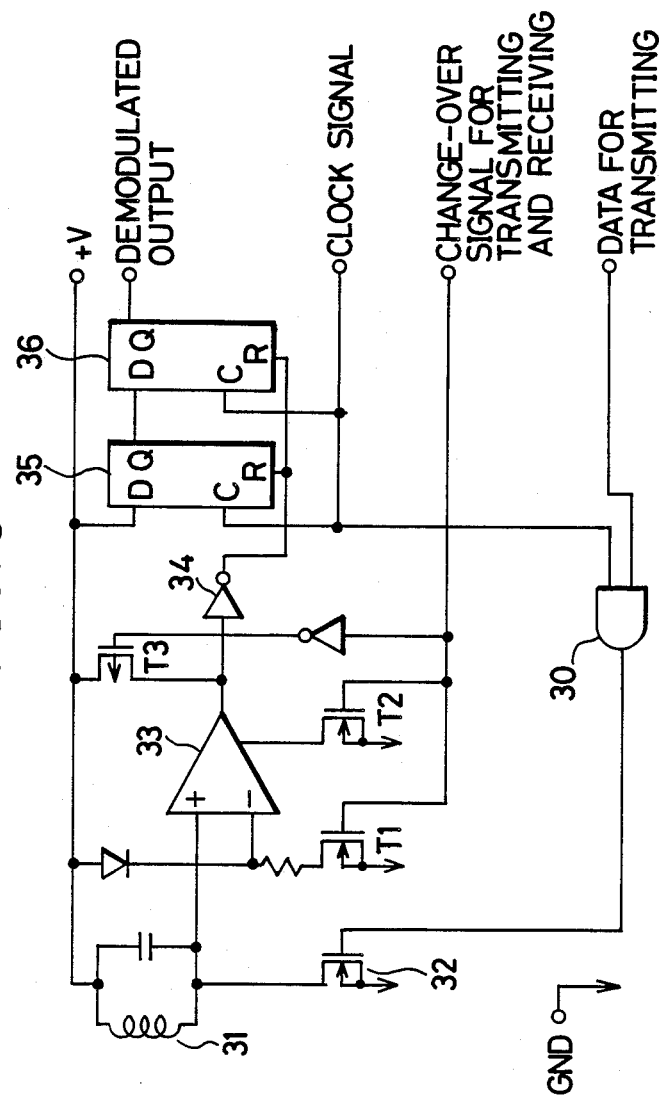
FIG. 6 is a circuit diagram showing one embodiment of an interface section of FIG. 3, FIGS. 7 and 8 are waveforms for explanating the operation of the interface section of FIG. 6.

FIG. 6 is a circuit diagram showing one embodiment of the foregoing interface section 8a which comprises a transmitter system having an AND gate 30 for receiving data for transmitting and a clock signal, and a transistor 32 which operates in ON-OFF states to output to a transmitting and receiving coil 31 in response to the output of the AND gate 30, and a receiver system having a pulse wave shaping circuit 33 for waveforming a signal from the transmitting and receiving coil 31, and D-type flipflops 35 and 36 for demodulating to H-L signals synchronized with the clock signal and for inputting the output signal of the pulse wave shaping circuit 33 through an inverter 34 to the reset terminal of the D-type flipflops.

Each of reference characters $T_1$, $T_2$ and $T_3$ is a switching transistor for changing from a transmitter mode to a receiver mode and vice versa.

The switching transistors $T_1$, $T_2$ and $T_3$ are controlled by a change-over signal for controlling the transmitting and receiving modes.

The system operation between the wristwatch B and the controller will be described, referring to FIG. 10A, FIG. 10B and FIG. 10C.

Figure 10A:
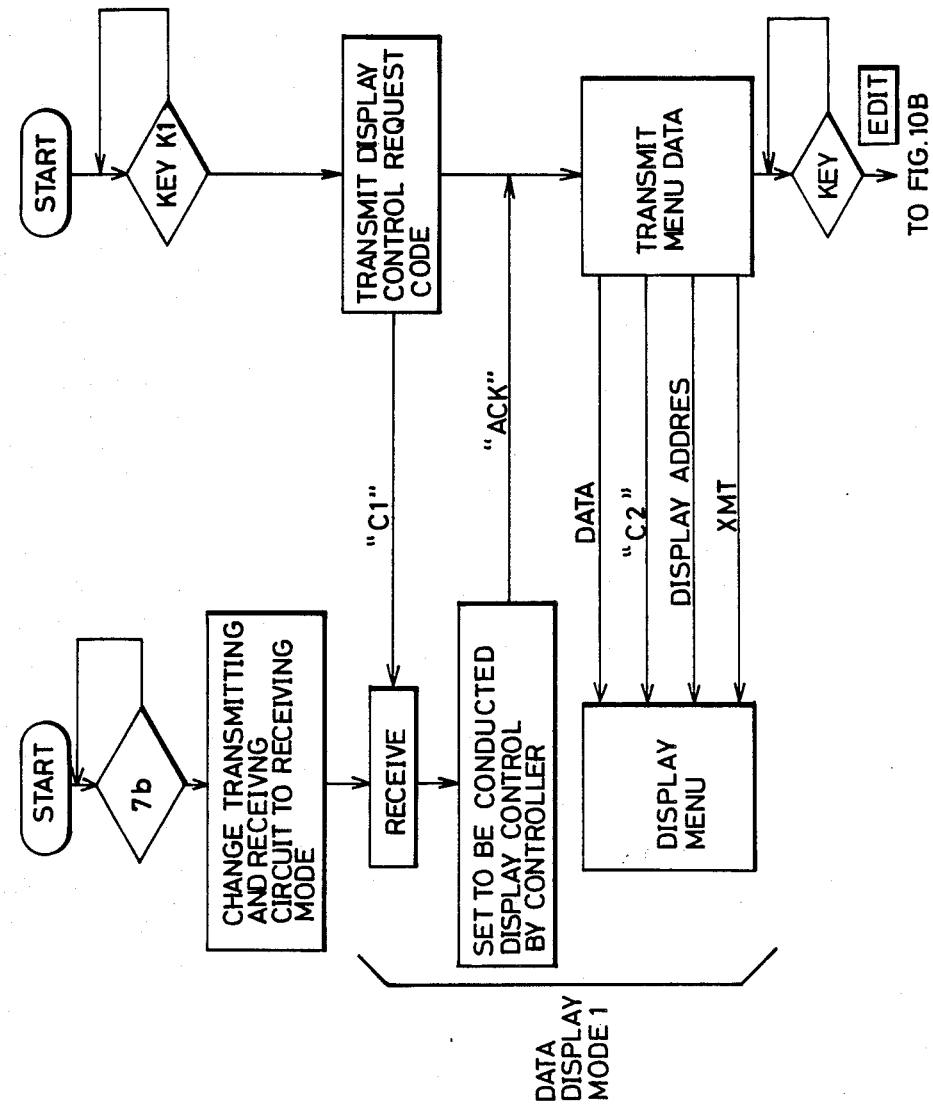

FIGS. 10A, 10B and 10C together form a flow-chart for inputting edited data to the wristwatch B by using the controller A. This flow-chart consists of [DATA DISPLAY MODE 1], [DATA TRANSMITTING MODE 1], [DATA DISPLAY MODE 2] and [DATA TRANSMITTING MODE 2].

When the button switch 7b of the wristwatch B is depressed, the transmitting and receiving circuit 18 is placed in a receiving mode in a transmitting and receiving condition.

On the other hand, when a key $K_1$ for inputting and editing data is depressed, the system operation between the wristwatch B and the controller A becomes [DATA DISPLAY MODE 1] as shown in FIG. 10A.

[DATA DISPLAY MODE 1]

Code $C_1$ produced by the depression of the key $k_1$ is converted to a serial signal by the transmitting and receiving circuit 18 (as shown by signal (B) of FIG. 7) and is transmitted as a magnetic flux from the coil 31 of the transmitting and receiving circuit 18 to the wristwatch B (as shown by signal (D) of FIG. 7).

This magnetic flux is detected by the transmitting and receiving coil of the wristwatch B so as to change to an electric signal (as shown by signal (A) of FIG. 8) and the electric signal is demodulated by pulse wave shaping circuit 33 to a space-mark signal synchronized with a clock signal (as shown by signal (E) of FIG. 8).

This demodulated signal is converted to a parallel signal in the serial/parallel conversion circuit 8b and the parallel signal is inputted through the data bus line 24 to CPU19. CPU19 enters a stand-by condition of the receiving mode after receiving the code "$C_1$". CPU19 transmits an acknowledge response code "ACK" through the transmitting and receiving circuit 18 to the controller A after the stand-by of the receiving mode. At this stage, the controller sends the top address of data to be stored in the display RAM21 so as to set the stored address.

After the above stage, the data produced on the data processing process is sent from the RAM12 of the controller to the wristwatch, when the data processing process is executed in the controller A.

When the sending of the data is completed, the data separate code "$C_2$" is sent to the wristwatch B together with the display address of the data for flashing a display on the liquid crystal display panel 27.

At a time when the sending of all the above data (including menu data of FIG. 10A) is completed, a transmitting end control code "XMT" is sent to the wristwatch B from the controller A.

[DATA TRANSMITTING MODE 1]

The controller sends a code "$C_3$" to the wristwatch B in response to the depression of a key for editing data.

CPU19 enters a stand-by condition of the receiving mode after receiving the code "$C_3$". CPU19 transmits acknowledge response code "ACK" through the transmitting and receiving circuit 18 to the controller. The wristwatch transmits the date (corresponding to 1,000-character) in the RAM22 directly to RAM12 of the controller A.

The system operation between the wristwatch B and the controller A becomes [DATA DISPLAY MODE 2].

At this time, the liquid crystal display panel 27 of the wristwatch functions as a display of the controller A. That is, the content of a key for memo date of the controller A is displayed on the display panel 27.

When the end-key is depressed in the controller, the system operation between the wristwatch B and the controller A enters on [DATA TRANSMITTING MODE 2].

Code "C4" is transmitted from the controller to the wristwatch.

When the receiving mode is completed, CPU19 is interrupted by the interruption generating circuit 8d. As a result, CPU19 checks whether the received data has an error or not. After the check, CPU19 transmits "ACK" if the received data has no error.

The controller sends the top address of the RAM22 which designates the location to store the data of RAM12 in RAM22. Then, the memo data in RAM12 of the controller is transmitted directly to RAM22 so that the memo data is stored in RAM12.

In case that a wearer of the wristwatch B watches the memo data in RAM12, he selects the memo mode with the operation of the button switch 7a. Then, he can watch the memo data in RAM12 with the operation of the button switch 7c and 7d.

Figure 9A:
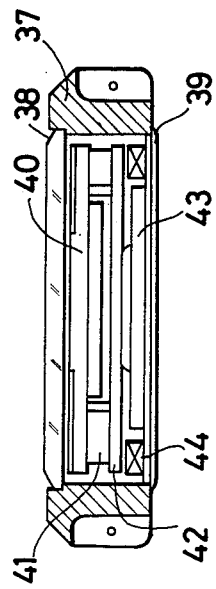
FIG. 9A is a sectional view showing the internal construction of the wristwatch.

FIG. 9A is a sectional view showing a construction of the wristwatch B.

The reference numeral 37 is a case for forming a housing or casing, and a caseback or rear face 39 and a glass plate or front face 38 are attached to the lower portion and upper portion, respectively, of the case 37. The housing includes a liquid crystal display panel 40 arranged adjacent to the glass plate 38, a circuit board 42 including a signal processing circuit connected through a connector 41 to the liquid crystal display panel 40, a battery 43 for providing power between the circuit board 42 and the caseback 39, and a transmitting and receiving coil 44 disposed adjacent to the rear face 39 and comprised of loops lying in a plane which is adjacent to and opposed to the rear face 39, the coil 44, the periphery of the battery 43 and executing the transmitting and receiving of data between the external controller and the wristwatch.

Figure 9B:
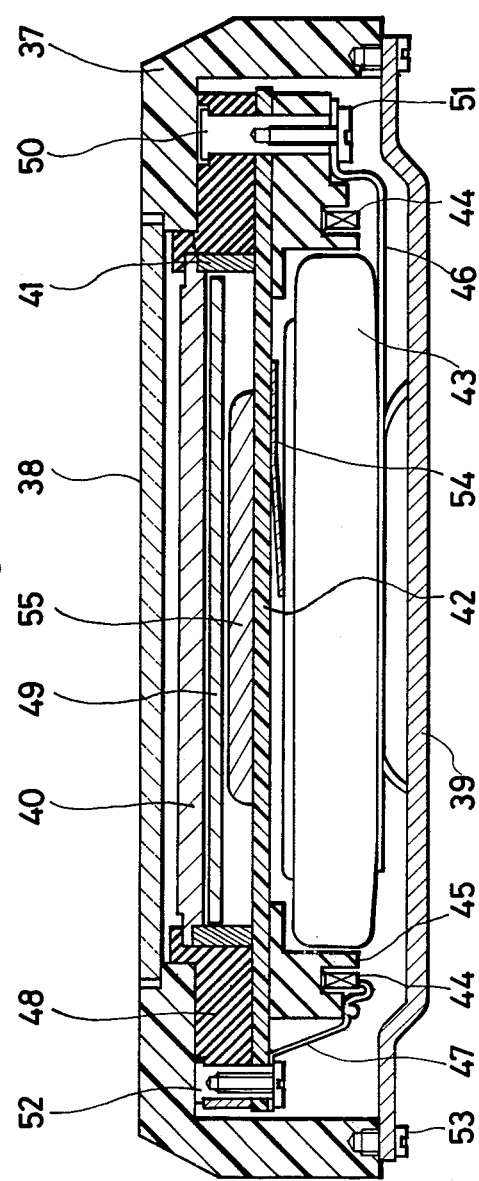
FIG. 9B is a sectional view showing another internal construction of the wristwatch.

FIG. 9B is a sectional view showing another embodiment of the internal construction of a wristwatch. A transmitting and receiving coil 44 surrounds a battery frame 45 for positioning a battery 43, and the coil 44 is connected through a coil lead 47 to a circuit board 42 with a set-screw 53 fixed to a screw pin 52. A sealing member 55 for an IC is mounted on the circuit board 42 which is disposed between a liquid crystal display panel 40 and the battery 43.

To make electrical connection between the liquid crystal display panel 40 and the circuit board 42, a conductive connector 41 is used and serves to support the liquid crystal display panel 40. A panel frame 48 serves to support the liquid crystal display panel 40 which has a reflection plate 49 disposed adjacent the underside thereof.

The battery 43 is supported by battery bridles 46 and 54, and the battery bridle 46 is fixed to a screw pin 50 by a set screw 51. The screw pin 50 is fixed through the circuit board 42 to a case 37 which holds a caseback 39 made of stainless steel and a glass plate 38.

As shown in FIG. 9A and FIG. 9B, the transmitting and receiving coil 44 is inside of the wristwatch so that the wristwatch maintains its waterproof characteristic.

As mentioned above, a data stored display device according to this invention is not only possible to be small and waterproof, but also portable, because there is no need of using a connector for connecting the data stored display device to the external controller.

What is claimed is:

1. A data storing means for storing data and for displaying said data at the request of an operator, comprising: a portable data display device for displaying data, said display device including a casing having a front face and a rear face spaced from the front face, first memory means for storing a control program, a first processing unit for generating control signals according to said control program and control signals from the outside, first receiving and transmitting means disposed within the casing for receiving airwave data and control signals from the outside and for transmitting data and control signals to the outside by airwave and having a first coil comprised of loops lying in a plane which is opposed to the rear face, a first capacitor connected electrically in parallel with said first coil, first modulating means for modulating data and control signals to electric signals to be transmitted to the outside, first demodulating means for demodulating electric signals generated by said first coil to data and control signals, and first switching means responsive to said first processing unit for activating said first demodulating means, second memory means for storing said data received by said first processing unit, switch means for requesting said first processing unit to display said data stored in said second memory means, display control means coacting with said first processing unit for generating display control signals representative of said data stored in said second memory means, and display means disposed adjacent to the front face in the casing and responsive to said display control signals for displaying on a display face thereof said data; and an external controller for inputting data to be inputted in said display device, said controller including a keyboard for entering data to be set in said display device, third memory means for storing a control program, a second processing unit for generating control signals from said display device, second receiving and transmitting means for receiving airwave data and control signals from said display device and for transmitting data and control signals to said display device by airwave and having a second coil, a second capacitor connected electrically in parallel with said second coil, second modulating means for modulating data and control signals to electric signals to be transmitted to said display device, second demodulating means for demodulating electric signals generated by said second coil, and second switching means responsive to said second processing unit for activating said second demodulating means, fourth memory means for storing said data received by said second processing unit, and a holder having means for accommodating therein the second coil and for supporting thereon the rear face of the casing of said display device when said external controller transmits said data and control signals to said display device so that the display face of said display device can be viewed by an operator through the front face of the casing to enable the operator to view said inputted data and so that the first coil is closely electrically coupled to the second coil through the rear face of the casing.

2. A data storing system as claimed in claim 1; wherein said display device further includes a stand-by switch for activating said receiving means.

3. A data storing system as claimed in claim 1; wherein said display device further includes a time signal generating means for generating actual time information.

4. A data storing system as claimed in claim 3; including means for effecting the storing of said generated actual time information in said second memory means.

5. A data storing system as claimed in claim 4; wherein said display device further includes a stand-by switch for activating said receiving means.

6. A data storing system as claimed in claim 4; wherein said display device further includes a mode switch for effecting the display of the actual time.

7. A data storing system as claimed in claim 1; including a battery disposed inside the casing on the rear face thereof.

8. A data storing system as claimed in claim 7; wherein the casing includes means for supporting the first coil around the battery.

* * * * *